(12) United States Patent
Kozel et al.

(10) Patent No.: US 12,174,134 B2
(45) Date of Patent: Dec. 24, 2024

(54) THERMOGRAPHIC INSPECTION OF ELECTRICAL EQUIPMENT

(71) Applicant: ABB Schweiz AG, Baden (CH)

(72) Inventors: Tomas Kozel, Brno (CZ); Gregory Rossano, Enfield, CT (US); Jianjun Wang, West Hartford, CT (US)

(73) Assignee: ABB SCHWIEZ AG, Baden (CH)

( * ) Notice: Subject to any disclaimer, the term of this patent is extended or adjusted under 35 U.S.C. 154(b) by 784 days.

(21) Appl. No.: 16/990,450

(22) Filed: Aug. 11, 2020

(65) Prior Publication Data
US 2020/0371055 A1 Nov. 26, 2020

Related U.S. Application Data

(63) Continuation of application No. PCT/US2018/064874, filed on Dec. 11, 2018.

(60) Provisional application No. 62/608,934, filed on Dec. 21, 2017.

(51) Int. Cl.
G01N 25/72 (2006.01)
G01J 5/00 (2022.01)
G01J 5/02 (2022.01)
G01J 5/04 (2006.01)
G01J 5/48 (2022.01)

(52) U.S. Cl.
CPC ............ *G01N 25/72* (2013.01); *G01J 5/0096* (2013.01); *G01J 5/025* (2013.01); *G01J 5/041* (2013.01); *G01J 2005/0077* (2013.01); *G01J 5/48* (2013.01)

(58) Field of Classification Search
CPC ........ G01N 25/72; G01J 5/0096; G01J 5/025; G01J 5/041; G01J 5/48; G01J 2005/0077; G01J 5/047
See application file for complete search history.

(56) References Cited

U.S. PATENT DOCUMENTS

| | | | | |
|---|---|---|---|---|
| 2007/0087311 | A1* | 4/2007 | Garvey, III | G01J 5/025 434/21 |
| 2008/0099678 | A1* | 5/2008 | Johnson | G01J 5/025 250/332 |
| 2008/0291040 | A1* | 11/2008 | Cutsforth | G05B 23/0283 340/653 |

(Continued)

FOREIGN PATENT DOCUMENTS

| | | |
|---|---|---|
| CN | 101661658 A | 3/2010 |
| CN | 103630255 A | 3/2014 |

(Continued)

OTHER PUBLICATIONS

International Searching Authority / US, International Search Report & Written Opinion issued in corresponding Application No. PCT/US2018/064874, mailed Mar. 5, 2019, 10 pp.

(Continued)

*Primary Examiner* — Brandi N Hopkins
*Assistant Examiner* — Janice M Soto
(74) *Attorney, Agent, or Firm* — Greenberg Traurig, LLP

(57) ABSTRACT

A thermographic inspection system is provided for inspecting electrical equipment. The system may be used while the electrical equipment is energized to monitor active performance of the equipment. The system may be used to monitor temperature differences of various components in the equipment.

17 Claims, 1 Drawing Sheet

(56) References Cited

U.S. PATENT DOCUMENTS

| | | | |
|---|---|---|---|
| 2010/0044567 A1 | 2/2010 | Brandt et al. | |
| 2010/0163730 A1 | 7/2010 | Schmidt et al. | |
| 2011/0122251 A1 | 5/2011 | Schmidt | |
| 2011/0125420 A1 | 5/2011 | Garvey, III et al. | |
| 2015/0103862 A1 | 4/2015 | Wei et al. | |
| 2015/0304612 A1 | 10/2015 | Richards et al. | |
| 2015/0369751 A1* | 12/2015 | Cheim | G01R 31/62 |
| | | | 702/40 |
| 2017/0094228 A1* | 3/2017 | Israelson | H04N 23/20 |

FOREIGN PATENT DOCUMENTS

| | | | |
|---|---|---|---|
| CN | 105588608 A | * | 5/2016 |
| EP | 3010101 | | 4/2016 |
| EP | 3171469 | | 5/2017 |

OTHER PUBLICATIONS

The International Bureau of WIPO, International Preliminary Report on Patentability issued in corresponding Application No. PCT/US2018/064874, mailed Jul. 2, 2020, 9 pp.

Yan, Yunfeng, et al.; "A Real-Time Ir-Fusion Switchgear Contact Monitoring System (SCMS)"; IEEE Access; vol. 5; Jul. 17, 2017; pp. 12114-12124 (China).

* cited by examiner

THERMOGRAPHIC INSPECTION OF ELECTRICAL EQUIPMENT

BACKGROUND

The present inventions relate generally to inspection of electrical equipment, and more particularly, to the use of thermographic inspection thereof.

Electrical equipment is subject to wear and deterioration over time and is preferably inspected prior to actual failures of the equipment. In many cases, inspections of electrical equipment occur when the equipment is deactivated due to safety concerns. However, inspections of this type provide limited information on the condition of electrical equipment. One example of the type of electrical equipment that may be inspected on a periodical basis is switchgear or controlgear. Certain electrical equipment is also housed within enclosed cabinets, which makes inspection more challenging.

SUMMARY

A thermographic inspection arrangement is described for inspecting electrical equipment while it is energized. The inspection system makes it possible to view differences in the temperature of different electrical components in the equipment. Preferably, a warning is generated when temperature variations exceed a threshold.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
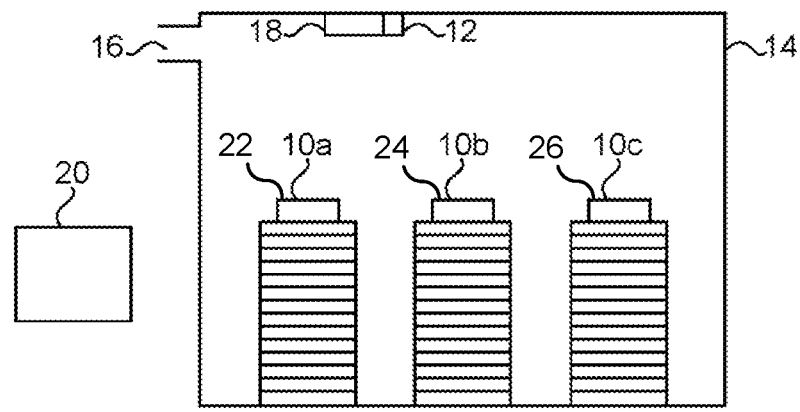
FIG. 1 is a schematic view of a system for inspecting electrical equipment.
Figure 2:
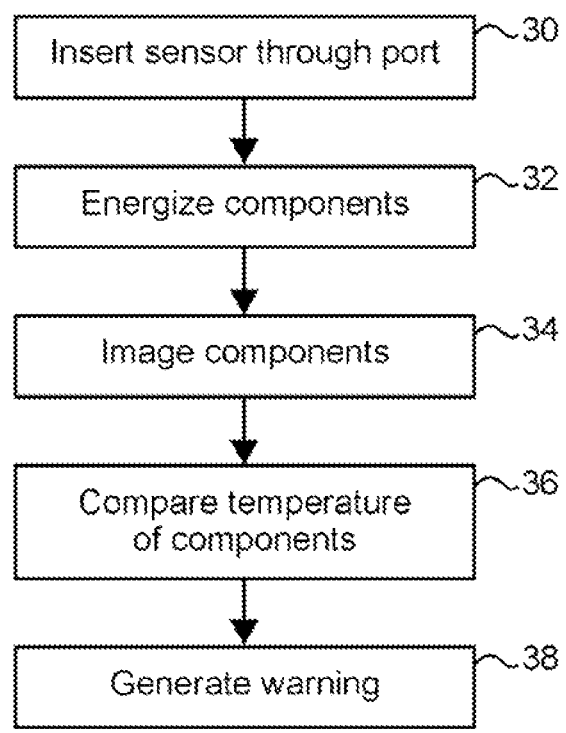
FIG. 2 is a flow chart of a method of inspecting electrical equipment.

A system for inspecting electrical equipment 10 is shown in FIG. 1 and a method of inspecting the electrical equipment 10 is provided in FIG. 2. The system allows electrical equipment 10 to be inspected while the equipment 10 is energized (32) to monitor active performance of the equipment 10. The system may use a thermographic sensor 12 that images electrical components 10a,b,c in the equipment 10 (34). The equipment 10 may be enclosed in an electrical cabinet 14, and the sensor 12 may be inserted into the cabinet 14 through a port 16. The image provides temperature data for the components 10a,b,c within the image. The system compares temperature data of the components 10a,b,c within the image (36) and generates a warning when temperature variations exceed a threshold (38).

As shown in FIG. 1, the electrical components 10a,b,c may be enclosed in an electrical cabinet 14. A port 16 may be provided for inserting the thermographic sensor 12 into the cabinet 14. The sensor 12 may be attached to a portion of a robot 18 sized to pass through the port 16. A human viewable display 20 may also be provided for displaying images from the sensor 14.

The method of inspecting electrical equipment, such as switchgear or control gear, includes energizing electrical components enclosed within an electrical cabinet. A thermographic sensor may be inserted through a port in the electrical cabinet while preventing human access inside of the electrical cabinet. At least two of the electrical components may be imaged with the thermographic sensor with a single image while the electrical components are energized. Temperature data of the at least two electrical components may be compared from the single image. A warning may be generated when a variation in the temperature data of the at least two electrical components relative to each other is higher than a threshold.

The single image may be captured as a single exposure of an image sensor. Alternatively, an image sensor may capture multiple exposures from different angles or locations, and the multiple exposures may be patched together to form a single image for subsequent viewing and/or analysis.

The thermographic sensor may be attached to a portion of a robot sized to pass through the port in the electrical cabinet. The port may be sized to prevent human access inside of the electrical cabinet.

Alternatively, the thermographic sensor may be attached to a robot sized to pass through the port in the electrical cabinet. The port may be sized to prevent human access inside of the electrical cabinet. The robot may be configured to move within the electrical cabinet.

The thermographic sensor may be withdrawn through the port after imaging the at least two electrical components.

The single image may be recorded. The at least two electrical components may be reimaged with another single image more than one week after the imaging. Temperature data of at least one of the electrical components in the single image and the another single image may be compared. A warning may be generated when a variation in the temperature data of the at least one electrical component relative to the single image and the another single image is higher than a threshold.

The thermographic sensor may be removably fixed to a same location for the imaging and reimaging. The thermographic sensor may be removed from the electrical cabinet between the imaging and reimaging.

The at least two electrical components may include a matching component from each of three different phases.

The single image, or an equivalent image thereof, including a plurality of the electrical components may be displayed on a human viewable display. A human defined identification of the at least two components may be received.

A temperature color range of the single image, or the equivalent image thereof, may be adjusted on the human viewable display in response to human input.

A region of interest on each of the at least two electrical components may be identified by detecting a temperature boundary on or around each of the at least two electrical components. The temperature data may be data within the temperature boundaries.

The temperature data of the at least two electrical components may be an average temperature within each of the temperature boundaries.

A first region of interest 22 may be identified by detecting a hottest point in the single image and detecting the temperature boundary therearound. A second region of interest 24 may be identified by detecting a hottest point in the single image outside of the first region of interest 22 and detecting the temperature boundary therearound.

A third region of interest 26 may be identified by detecting a hottest point in the single image outside of the first and second regions of interest 22, 24 and detecting the temperature boundary therearound. The first, second and third regions of interest 22, 24, and 26 may each be on a matching component from each of three different phases.

The single image may include at least five temperature color ranges, where each of the five temperature color ranges covers between 5° C. and 15° C.

The at least two electrical components may include a matching component from each of three different phases. The thermographic sensor may be withdrawn through the port after imaging the matching components. The thermographic sensor may be attached to a portion of a robot sized to pass through the port in the electrical cabinet. The port may be sized to prevent human access inside of the electrical cabinet.

The single image, or an equivalent image thereof, including a plurality of the electrical components may be displayed on a human viewable display. A temperature color range of the single image, or the equivalent image thereof, may be adjusted on the human viewable display in response to human input. A human defined identification of the at least two components may be received.

A region of interest on each of the matching components may be identified by detecting a temperature boundary on or around each of the matching components. The temperature data may include data within the temperature boundaries.

The temperature data of the matching components may include an average temperature within each of the temperature boundaries.

The thermographic sensor may be withdrawn through the port after imaging the at least two electrical components. The thermographic sensor may be attached to a portion of a robot sized to pass through the port in the electrical cabinet. The port may be sized to prevent human access inside of the electrical cabinet. The single image may be recorded. The at least two electrical components may be reimaged with another single image more than one week after the imaging. Temperature data of at least one of the electrical components in the single image and the another single image may be compared. A warning may be generated when a variation in the temperature data of the at least one electrical component relative to the single image and the another single image is higher than a threshold.

The thermographic sensor may be removably fixed to a same location for the imaging and reimaging. The thermographic sensor may be removed from the electrical cabinet between the imaging and reimaging.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of inspecting electrical equipment, comprising:
    energizing electrical components enclosed within an electrical cabinet;
    inserting a thermographic sensor through a port in the electrical cabinet while preventing human access inside of the electrical cabinet;
    imaging at least two electrical components with the thermographic sensor with a single image while the electrical components are energized;
    identifying respective regions of interest of the at least two electrical components in the single image;
    identifying a first region of interest around a first electrical component by detecting a hottest point in the respective regions of interest in the single image and detecting a first temperature boundary around the first electrical component;
    identifying a second region of interest around a second electrical component by detecting a hottest point in the respective regions of interest in the single image outside the first region of interest and detecting a second temperature boundary around the second electrical component;
    comparing a temperature data of the at least two electrical components from the single image, wherein the temperature data comprises data within the first temperature boundary and the second temperature boundary; and
    generating a warning when a variation in the temperature data of the at least two electrical components relative to each other is higher than a threshold,
    wherein the thermographic sensor is attached to a portion of a robot sized to pass through the port in the electrical cabinet, the port being sized to prevent human access inside of the electrical cabinet.

2. The method according to claim 1, wherein the robot being configured to move within the electrical cabinet.

3. The method according to claim 1, further comprising:
    withdrawing the thermographic sensor through the port after imaging the at least two electrical components.

4. The method according to claim 1, further comprising:
    recording the single image, reimaging the at least two electrical components with another single image more than one week after the imaging, comparing temperature data of at least one of the electrical components in the single image and the another single image, and generating a warning when a variation in the temperature data of the at least one electrical component relative to the single image and the another single image is higher than a threshold.

5. The method according to claim 4, further comprising:
    removably fixing the thermographic sensor to a same location for the imaging and reimaging, and removing the thermographic sensor from the electrical cabinet between the imaging and reimaging.

6. The method according to claim 1, wherein the at least two electrical components comprise a matching component from each of three different phases.

7. The method according to claim 1, further comprising:
    displaying the single image, or an equivalent image thereof, comprising a plurality of the electrical components on a human viewable display, and receiving a human defined identification of the at least two components.

8. The method according to claim 7, further comprising:
    adjusting a temperature color range of the single image, or the equivalent image thereof, on the human viewable display in response to human input.

9. The method according to claim 1, wherein the temperature data of the at least two electrical components comprises an average temperature within each of the temperature boundaries.

10. The method according to claim 1, further comprising:
identifying a third region of interest around a third electrical component by detecting a hottest point in the respective regions of interest in the single image outside of the first region of interest and the second region of interest and detecting a third temperature boundary around the third electrical component, the at least two electrical components including the third electrical component,
wherein the first, second and third regions of interest each being on a matching component from each of three different phases.

11. The method according to claim 1, wherein the single image comprises at least five temperature color ranges, and each of the five temperature color ranges covers between 5° C. and 15° C.

12. The method according to claim 1, wherein the at least two electrical components comprise a matching component from each of three different phases, and the method further comprising:
withdrawing the thermographic sensor through the port after imaging the matching components, wherein the thermographic sensor is attached to a portion of a robot sized to pass through the port in the electrical cabinet, the port being sized to prevent human access inside of the electrical cabinet.

13. The method according to claim 12, further comprising:
displaying the single image, or an equivalent image thereof, comprising a plurality of the electrical components on a human viewable display, adjusting a temperature color range of the single image, or the equivalent image thereof, on the human viewable display in response to human input, and receiving a human defined identification of the matching components.

14. The method according to claim 13, further comprising:
identifying the respective region of interest on each of the matching components by detecting the temperature boundary on or around each of the matching components, the temperature data comprising data within the temperature boundaries.

15. The method according to claim 14, wherein the temperature data of the matching components comprises an average temperature within each of the temperature boundaries.

16. The method according to claim 1, further comprising withdrawing the thermographic sensor through the port after imaging the at least two electrical components, wherein the thermographic sensor is attached to a portion of a robot sized to pass through the port in the electrical cabinet, the port being sized to prevent human access inside of the electrical cabinet, and further comprising recording the single image, reimaging the at least two electrical components with another single image more than one week after the imaging, comparing temperature data of at least one of the electrical components in the single image and the another single image, and generating a warning when a variation in the temperature data of the at least one electrical component relative to the single image and the another single image is higher than a threshold.

17. The method according to claim 16, further comprising removably fixing the thermographic sensor to a same location for the imaging and reimaging, and removing the thermographic sensor from the electrical cabinet between the imaging and reimaging.

* * * * *